United States Patent [19]

Mudryk et al.

[11] Patent Number: 5,981,751

[45] Date of Patent: Nov. 9, 1999

[54] METHOD FOR REMOVAL OF RESIDUAL ORGANIC SOLVENTS AND USE THEREOF IN MANUFACTURING PHARMACEUTICALS

[75] Inventors: Bogdan Mudryk, East Windsor, N.J.; Jen-Sen Dung, Boothwyn, Pa.; Chester Sapino, Sewell, N.J.; James Guro, Newark, Del.

[73] Assignee: Johnson Matthey Public Limited Company, London, United Kingdom

[21] Appl. No.: 09/138,086

[22] Filed: Aug. 21, 1998

[30] Foreign Application Priority Data

Aug. 12, 1997 [GB] United Kingdom .................. 9717629

[51] Int. Cl.6 ...................... C07D 489/00; C07D 489/06
[52] U.S. Cl. .................................. 546/45; 546/45; 546/46
[58] Field of Search ........................................ 546/44, 45

[56] References Cited

U.S. PATENT DOCUMENTS

| 4,224,371 | 9/1980 | Amiard et al. | 424/246 |
|---|---|---|---|
| 4,692,519 | 9/1987 | Naito et al. | 540/227 |
| 5,756,745 | 5/1998 | Kavka | 546/44 |
| 5,886,001 | 3/1999 | Schmidhammer | 514/279 |

FOREIGN PATENT DOCUMENTS

| 0 224 026 | 12/1988 | European Pat. Off. | B01D 11/02 |
|---|---|---|---|
| 1 390 772 | 4/1975 | United Kingdom | A61K 31/485 |

OTHER PUBLICATIONS

Stuttgart, ROMPP Chemie Lexikon, 9. Edition, vol. 3 (1990) p. 1886 (XP002085918).
Stuttgart, ROMPP Chemie Lexikon, 9. Edition vol. 4 (1991) p. 3180 (XP002085919).
Merck Index; 10th Edition; 1983., p. 998.

*Primary Examiner*—Mukund J. Shah
*Assistant Examiner*—Pavanaram K Sripada
*Attorney, Agent, or Firm*—Pillsbury Madison & Sutro LLP

[57] ABSTRACT

A method for removing residual organic solvents from a bulk substance, for example from a pharmaceutical drug substance, comprises drying the bulk substance in the presence of water vapor, such that the residual organic solvent molecules are displaced with water vapor molecules.

17 Claims, No Drawings

METHOD FOR REMOVAL OF RESIDUAL ORGANIC SOLVENTS AND USE THEREOF IN MANUFACTURING PHARMACEUTICALS

The present invention relates to a process for removing residual organic solvents from a bulk substance, for example from pharmaceutical drug substances.

Residual organic solvents found in bulk pharmaceutical products or pharmaceutical intermediates are normally removed by drying the bulk in an oven or by blowing the bulk dry on a filter. The temperature selected must be one at which the bulk drug is deemed stable. Unfortunately, some solvents, like aliphatic alcohols, can be difficult to remove to or below a pharmaceutically acceptable level even after drying under high vacuum at elevated temperatures for extended periods of time, for example days or even weeks. In addition, these prolonged drying condition can cause instabilities in bulk drug substances. The increased pH due to loss of acids such as hydrochloric acid and hydrobromic acid from acid addition salts, as well as colour generation and crystal instability are undesirable side effects of prolonged drying. Furthermore, it may be impossible to remove certain organic solvents to acceptable levels by normal drying techniques without causing degradation of the bulk substance, due to entrapment of these organic solvents inside the crystal lattice.

A specific case of such problems is hydrocodone bitartrate, which is recrystallised from ethanol/water and can contain 1–3wt % of ethanol even after 1–2 hours' drying on a vacuum or pressure filter followed by 24 hours' vacuum drying in an oven at 60° C. (1 mm Hg). It is nearly impossible to reduce the ethanol level to less than 1 wt % even after several additional days of vacuum drying at 60° C. Another specific case is oxycodone hydrochloride, which is recrystallised from isopropanol/water and can contain 1–2wt % of isopropanol after 24 hours' drying on a vacuum or pressure filter followed by 24 hours' vacuum drying in a vacuum oven at 50–65° C. (1 mmHg). Continued drying to attempt to reduce the propanol levels to less than 1 wt % is futile.

The present invention overcomes the problems and difficulties associated with the state of the art methods of removing solvent residues by providing a process that is effective under very mild conditions and that displaces solvent molecules trapped within the bulk drug crystal with water vapour. Although the use of steam (ie water gas at 100° C.) has previously been proposed in solvent extraction processes, whereby raw or biological materials are extracted from their natural, solid environment by external organic solvents that are then removed by steam evaporation, the use of relatively low-temperature water vapour to replace internal solvent molecules within a bulk substance molecule or crystal structure has not previously been suggested.

Accordingly, the present invention provides a method for removing residual organic solvent molecules from within the crystal structure of a bulk substance, characterised in that the bulk substance is dried in the presence of water vapour, such that residual organic solvent molecules are displaced with water vapour molecules.

The preferred method may generally be termed "vacuum hydration" and, accordingly, the present invention provides a method for removing residual organic solvent molecules from within the crystal structure of a bulk substance, which method comprises vacuum hydration of the bulk substance, whereby residual organic solvent molecules are replaced by water vapour molecules. The method may be carried out by adapting a suitable drying method known in the art, by introducing water vapour into the drying process.

For example, vacuum hydration may be carried out in a drying oven at or below atmospheric pressure in the presence of water vapour. The water vapour may be supplied by, for example, placing a container of water in the oven. Suitably, the drying process is carried out under a vacuum of 1422 to 50524 pascals (atmospheric pressure to less than 1 mm Hg). The temperature of the oven may be from room temperature up to but just below the decomposition temperature of the bulk substance, such as in the range of from 0° to 100° C., preferably 25° to 90° C., more preferably below 70° C. However, any suitable combination of temperature or pressure may be used provided that the chosen conditions yield saturated water vapour.

An alternative method of vacuum hydrating the bulk substance is to use a pressure filter, for example a Nutsche filter, and pass water vapour over the surface of the filter. Suitably, the water vapour is supplied from a stream of wet nitrogen gas. Preferably, the nitrogen gas is pre-heated to a moderate temperature, suitably below 70° C., for example above 40° C., such as about 50° C., and then bubbled through a tank of water to make it saturated with water vapour.

A further method is to use a fluid bed drying operation whilst passing moist nitrogen gas into the fluid bed dryer at a temperature in the range of from >0° to 100° C. at atmospheric pressure.

Preferably, during the vacuum hydration process according to this invention, the vapour space around the bulk structure should be saturated with water vapour. The use of the process according to this invention to remove residual organic residues will lead to full hydration of the product if the final product is a stable hydrate. If the final product if not a hydrate, extra water absorbed by the vacuum hydration process can readily be removed by any suitable drying method known in the art, such as by drying in a vacuum oven or by blow drying on a filter with dry nitrogen at room temperature or elevated temperature in the absence of water added during the process.

Accordingly, the present invention further provides a process for preparing a substantially solvent-free hydrate of a bulk drug substance, which process is as hereinbefore described. The present invention therefore further provides process for preparing a substantially solvent-free bulk drug substance, which process is as hereinbefore described and including the step of thereafter drying the product of that process in the absence of water added during the process.

Preferably, the bulk crystalline substance is first dried such that it contains a minimum amount of residual organic solvent, such as 1–2% by weight of the substance, prior to carrying out the vacuum hydration process according to the present invention.

Suitably, the process described hereinbefore may be used in the manufacture of a pharmaceutical bulk substance where the removal of all organic residues is essential to meet current standards. For example, the method of the present invention can result in removal of the residual solvents to a level acceptable in accordance with FDA ICH (Food and Drug Administration International Conference on Harmonisation) regulations. These vary according to the particular formulation of the drug concerned and the particular residual solvent, but may include levels as low as from 250–500 ppm to 0.1–0.2% by weight, ie substantially solvent-free. Accordingly, the present invention provides a method of preparing a crystalline bulk drug substance that is substantially free from residual solvent molecules ("substantially solvent-free").

More generally, therefore, the present invention provides a method for preparing a bulk crystalline substance, which method comprises applying a drying process to the substance in the presence of water vapour, whereby (a) substantially all of the residual solvent molecules in the crystal structure are replaced by water vapour molecules; and/or (b) the substance becomes substantially free from residual organic solvent molecules. Suitably, the present invention is used to remove aliphatic alcohols, for example ethanol or propanol, from a bulk substance. Suitably, the bulk substance is hydrocodone bitartrate or oxycodone hydrochloride. The present invention accordingly provides a bulk substance such as a pharmaceutical or drug substance, for example hydrocodone or oxycodone and salts thereof, whenever prepared by the process of the invention, in particular, a substantially solvent-free substance.

The present invention will now be illustrated by the following examples, which are not intended to be limiting thereof.

EXAMPLE 1

Hydrocodone Bitartrate Hemipentahydrate

A sample of 149.4 g of hydrocodone bitartrate containing 2.1 wt % of ethanol was placed in a crystallisation dish. The sample was placed in a vacuum oven along with a crystallisation dish containing water (ca 200 ml). A vacuum was applied (16665 pascals (approximately 10 mm to 1 mm Hg)) and the sample was dried at 60° C. for 24 hours to afford 151.7 g of ethanol-free (as defined below) product. The water content measured by Karl Fisher titration was 9.66% which indicated that the final product was a hemipentahydrate.

EXAMPLE 2

Oxycodone Hydrochloride

A sample of 2.53 g oxycodone hydrochloride containing 1.5 wt % of 2-propanol was placed in a drying dish. The sample was placed in a vacuum oven along with a crystallisation dish containing water (ca 50 ml). A vacuum was applied (16665 pascals (approximately 10 mm to 1 mm Hg)) and the sample dried at 25° C. for 24 hours to afford 2.89 g of 2-propanol-free (as defined below) product. The water absorbed by the sample was removed by drying in a vacuum oven at 54° C. or 2 days in the absence of water.

EXAMPLE 3

Hydrocodone Bitartrate—Filter Method

Hydrocodone bitartrate (ca 10–12 kg) from a recrystallisation mixture containing ethanol and water was filtered and dried on a jacketed Nutsche filter to less than 3% ethanol. Further drying for a substantial period of time was incapable of removing the solvent any further below ca 3%. The semi-dried material was quadro-milled to break up some large chunks present, and returned back to the filter for hydration and solvent removal. A suitable jacketed vessel was filled approximately half full with water. Heat was applied to the jacket of the filter and the reactor to raise the jacket temperature to 50° C. A vacuum was pulled from the outlet of the filter so that the filter and reactor were under maximum vacuum. A nitrogen flow was introduced to the headspace of the reactor containing the water. The nitrogen carried hot water vapour to the filter and passed through the filter cake. The filter jacket was kept at ca 50° C. to prevent water condensing on the walls inside the filter. The nitrogen flow was continued until the cake reached a water content of 7.5–12% as determined by Karl Fisher titration, and the ethanol level was reduced to less than 0.5% as determined by gas chromatographic analysis (ca 16–24 hours). The hot water vapour had therefore displaced the ethanol from the crystal lattice, as determined below.

EXAMPLES 1 TO 3

Purity Determination

The ethanol and 2-propanol (isopropanol) contents of the vacuum-hydrated products prepared in Examples 1 to 3 were monitored by 300 MHz $^1$H NMR using deuterochloroform as the solvent and tetramethylsilane as the internal standard. In the starting material, the diagnostic peaks for ethanol were at 1.04 ppm (triplet, 3H) and 3.41 ppm (quartet, 2H), and for isopropanol at 1.24 ppm (doublet, 6H). These peaks could not be detected by the NMR analysis (<0.1 wt %) after the vacuum-hydration procedures described above.

We claim:

1. In a method for removing residual organic solvent molecules from within the crystal structure of a bulk substance, the improvement wherein the residual organic solvent molecules are removed by drying the bulk substance in the presence of water vapour, such that the residual organic solvent molecules are displaced with water vapour molecules.

2. In a method for removing residual organic solvent molecules from within the crystal structure of a bulk substance, the improvement wherein the residual organic solvent molecules are removed by vacuum hydration of the bulk substance, whereby the residual organic solvent molecules are replaced by water vapour molecules.

3. A method according to claim 1 or claim 2, which is carried out in a drying oven.

4. A method according to claim 1 or claim 2, wherein the water vapour is supplied from a container of liquid water.

5. A method according to claim 1 or claim 2, which is carried out using a pressure filter.

6. A method according to claim 1 or claim 2, which is carried out under vacuum.

7. A method according to claim 1 or claim 2, which is carried out using a fluid bed dryer.

8. A method according to claim 1 or claim 2, wherein the water vapour is supplied from wet nitrogen gas.

9. A method according to claim 1 or claim 2, which is carried out at a temperature in the range of from room temperature up to, but just below, the decomposition temperature of the bulk substance.

10. A method according to claim 1 or claim 2, wherein the bulk substance is an opioid drug.

11. A method according to claim 1 or claim 2, wherein the organic solvent molecules to be removed are aliphatic alcohol molecules.

12. A method according to claim 1 or claim 2, for preparing a substantially solvent-free, hydrate of a bulk drug substance.

13. A method according to claim 1 or claim 2, which further comprises drying, in the absence of added water vapour, the substantially solvent-free, as defined hereinbefore, bulk substance thereby prepared.

14. A solvent-free substance prepared by a process according to claim 1 or claim 2.

15. A pharmaceutical substance, selected from the group consisting of hydrocodone and oxycodone and their salts, prepared by a process according to claim 1 or claim 2.

16. In a method for removing residual aliphatic alcohol solvent from hydrocodone or oxycodone crystals, the improvement which comprises subjecting said hydrocodone or oxycodone crystals to vacuum hydration such that the alcohol solvent is replaced by water vapour.

17. A method according to claim 1 or claim 2 wherein the bulk substance containing residual organic solvent is one from which the solvent is normally removed by drying in an oven or by blowing.

\* \* \* \* \*